(12) United States Patent
Sethia et al.

(10) Patent No.: US 7,181,767 B1
(45) Date of Patent: Feb. 20, 2007

(54) KEYPAD DEVICE SECURITY SYSTEM AND METHOD

(75) Inventors: Rajeev Sethia, Chandler, AZ (US); Franklyn H. Story, Chandler, AZ (US); Mark Buer, Chandler, AZ (US)

(73) Assignee: NXP B.V., Eindhaven (NL)

( * ) Notice: Subject to any disclaimer, the term of this patent is extended or adjusted under 35 U.S.C. 154(b) by 708 days.

(21) Appl. No.: 09/851,757

(22) Filed: May 8, 2001

(51) Int. Cl.
    *H04L 9/00* (2006.01)
(52) U.S. Cl. .......................................... 726/16; 726/26
(58) Field of Classification Search ................. 726/16, 726/26
    See application file for complete search history.

(56) References Cited

U.S. PATENT DOCUMENTS 4,333,090 A * 6/1982 Hirsch ........................ 380/52
4,926,173 A * 5/1990 Frielink ....................... 341/22
5,677,687 A * 10/1997 Valdenaire ................... 341/26

* cited by examiner

*Primary Examiner*—Gilberto Barrón, Jr.
*Assistant Examiner*—Jacob Lipman
(74) *Attorney, Agent, or Firm*—Peter Zawilski

(57) ABSTRACT

The present invention increases the difficulty of interpreting electromagnetic emissions from a keypad system by facilitating randomness in the electromagnetic emissions associated with a particular key activation. A keypad security circuit utilizes a set of digital values that varies over both time and the bits as a keypad driver word applied to a keypad attribute (e.g., a row or column). The keypad security system of the present invention drives the varying strong keypad driver signal to an attribute of a keypad switch matrix (e.g., the rows or columns), applies an independently configured weak driver signals to the opposing attribute of the keypad switch matrix, retrieves a resulting signal from the opposing attribute, and interprets the results to determine if a switch included in a keypad system was activated (e.g., a key is pressed).

9 Claims, 9 Drawing Sheets

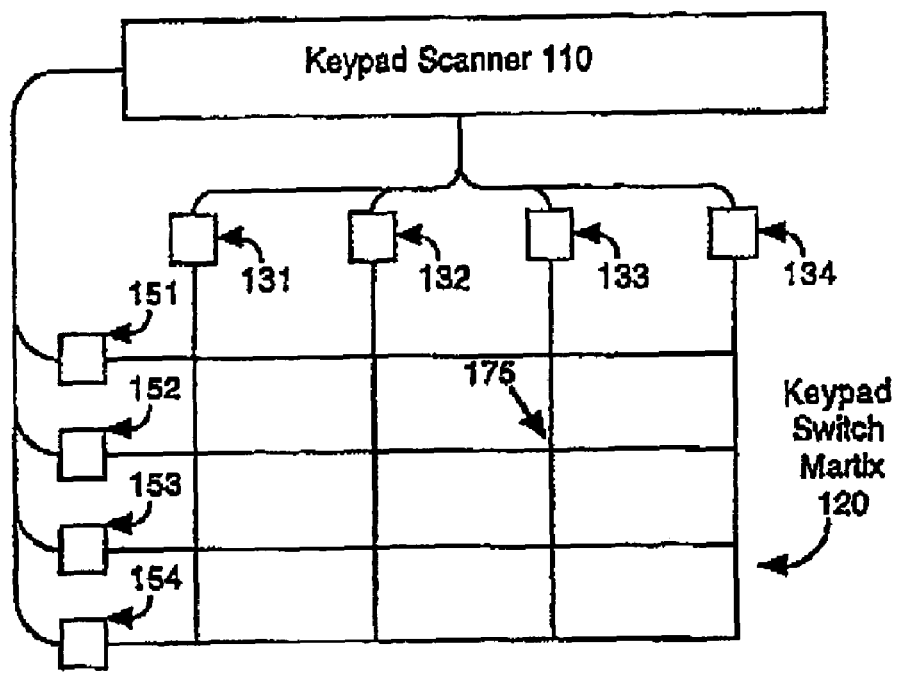
PRIOR ART   FIG 1A
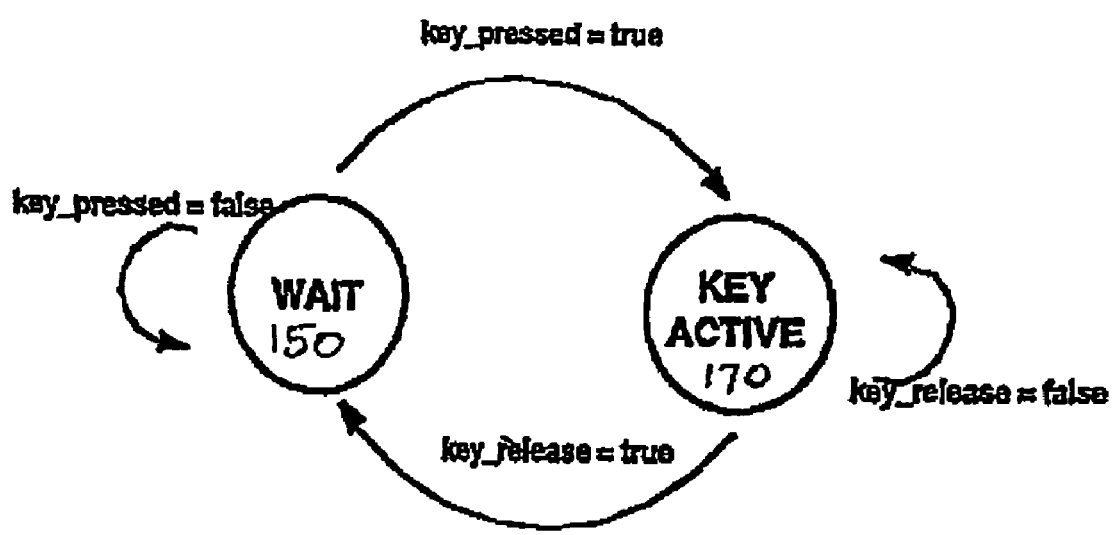
FIG 1B

VPB_base+keyconfig+0h (04000000h+000xx000h+10h=040xx010h thru 040xx04Ch)

| | D15 | D14 | D13 | D12 | D11 | D10 | D9 | D8 |
|---|---|---|---|---|---|---|---|---|
| | R | | | | | | | |
| POR | 0 | 0 | 0 | 0 | 0 | 0 | 0 | 0 |
| | D7 | D6 | D5 | D4 | D3 | D2 | D1 | D0 |
| | PAD_DRV | | | | | | | |
| POR | 0 | 0 | 0 | 0 | 0 | 0 | 0 | 0 |

| Bit | Name | Function |
|---|---|---|
| 15:8 | R | Reserved. These bits always return zero. |
| 7:0 | PAD_DRV | Pad drive data. Data driven out on either ROW[7:0] or COL[7:0]. The output (row or column) is driven with the data and the input (column or row) is pulled up or down, in the opposite direction of the data.<br>0 = drive the output low, pull up the input<br>1 = drive the output high, pull down the input |

VPB_base+keyconfig+0h (04000000h+000xx000h+50h=040xx050h)

| | D15 | D14 | D13 | D12 | D11 | D10 | D9 | D8 |
|---|---|---|---|---|---|---|---|---|
| | LFSR_DATA[15:8] | | | | | | | |
| POR | 0 | 0 | 0 | 0 | 0 | 0 | 0 | 0 |
| | D7 | D6 | D5 | D4 | D3 | D2 | D1 | D0 |
| | LFSR_DATA[7:0] | | | | | | | |
| POR | 0 | 0 | 0 | 0 | 0 | 0 | 0 | 1 |

| Bit | Name | Function |
|---|---|---|
| 7:0 | LFSR_DATA | LFSR load data. This write only register provides parallel load data to the DATAIN connections of the LFSR. |

FIG 7

KEYPAD DEVICE SECURITY SYSTEM AND METHOD

FIELD OF THE INVENTION

The present invention relates to the field of electronic keypad devices. More particularly, the present invention relates to a system and method for providing increased security protection from illicit deciphering of data entry in an electronic keypad device.

BACKGROUND

Electronic systems and circuits have made a significant contribution towards the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Electronic devices and systems designed to provide these results often have interfaces utilized to input information. One of the most common interfaces utilized for inputting information into an electronic system is a keypad. Traditional keypad devices typically provide a convenient input interface but are often susceptible to illicit interception of the input information.

As the name suggests, a keypad typically includes a number of keys or buttons that represent characters or a function (e.g., letters in the alphabet, numbers, punctuation characters, backspace, delete, page up, etc.). The keys are typically arranged in a matrix of columns and rows. Usually, each key corresponds to a switch which is activated by a physical manipulation of its corresponding key (e.g., pressing the key). The activation of a keypad switch is typically utilized to indicate the input of a character into the device or the input of an instruction. The user usually has to activate a number of keys in a particular sequence to complete the input of specific data.

FIG. 1A is a block diagram illustration of a typical keypad system 100 in which a keypad switch is located at each row and column intersection of the four by four switch matrix array 120. Switch matrix array 120 includes column pads 131 through 134 and row pads 151 through 154 and when a switch is activated it provides an electrical path between a row and column. Keypad scanner circuit 110 provides keypad scanner output signals and monitors keypad input signals. In traditional keypad systems, the scanner output signals are applied to the column pads and row pads as keypad driver signals. Resulting keypad signal changes on the rows or columns of keypad switch matrix 130 are fed back to keypad scanner circuit 110 as keypad scanner input signals. Traditional keypad systems are usually implemented with digital interfaces in which high and low voltage level signals are used at the interface with a "high voltage" signal (e.g., 5 volts) representing a logical one and a "low voltage" signal (e.g., zero volts) representing a logical zero. Standard keypad systems typically perform a keypad switch activation detection algorithm to determine if a key in a keypad matrix has been activated. The algorithm typically involves establishing a preliminary keypad state, detecting a keypad switch activation and determining which keypad switch is activated.

FIG. 1B is a state diagram for one exemplary traditional keypad system such as keypad system 100. Usually a default weak voltage (e.g., zero volts) signal at a particular logical value is applied to the rows of the keypad switch array and a strong voltage (e.g., 5 volts) signal is applied to each of the columns of the array. The keypad scanner then monitors the rows for a change in the applied signal. If all the rows have the logical value of the default weak voltage when the voltages on the rows of the array are read by the keypad scanner circuit, then no switch is closed and therefore no key is pressed. If a row has the logical value of a strong voltage, then a switch on that row is closed and the keypad system is in a wait state 150. To determine which of the switches on the row is closed, a similar algorithm is performed on the keypad matrix in key active state 170. A weak voltage (e.g., 5 volts) is applied to the columns of the array and a strong voltage (e.g., zero volts) to the rows of the array. When the resulting voltage values on the columns of the array are read by keypad scanner 110, the column with the strong voltage indicates the column of the closed switch. Keypad scanner 110 correlates the information indicating the row and the column of the closed switch to identify which key is pressed.

Traditionally, keypad systems apply one set of keypad driver signals (e.g., keypad scanner output signals) to the column pads and one set of keypad driver signals to the row pads. Each set of keypad driver signals forms a binary keypad driver word applied to the keypad switch matrix rows or columns and the logical value of each signal in a keypad driver word (e.g., keypad scanner output signals) is the same. For example, the logical value of each bit in a keypad driver word applied to the column pads of keypad switch matrix 120 is the same (e.g., a logical one) and the logical value of each bit in a keypad driver word applied to the row pads of keypad switch matrix 120 is the same (e.g., a logical zero).

Input information is often confidential and sensitive in nature. For example, passwords associated with a system for securing entrance into a location or access to information stored in an electronic device is often confidential. It is usually very important for the sensitive information to remain confidential, however, most systems have features that are vulnerable to illicit interception of information. Input devices such as keypad devices are often "unprotected" and traditional keypads have a number of characteristics that make them susceptible to unauthorized interception of input information. Traditional keypads are susceptible to visual attempts at compromising the security of confidential information. For example, someone can observe the key strokes as a user physically activates the keys on the keypad. Relatively good protection from visual interception of sensitive information is provided by screening the visual access of others to the keypad. One particularly troublesome and vulnerable characteristic of keypads is the emission of electromagnetic fields that result when a switch in a keypad matrix is activated. The nature of electromagnetic emissions makes it very difficult to protect against illicit interception and the limited number of different electromagnetic emission signatures a traditional keypad device exhibits makes interpretation of the emissions relatively easy.

Electromagnetic emissions from traditional keypad systems are easily intercepted by electromagnetic induction (EMI) techniques. Usually, each activated switch in a traditional keypad matrix produces unique electromagnetic emissions when a traditional keypad scanner is performing a keypad scan. Typically, it is relatively simple to detect changes in electromagnetic fields caused by keypresses and it is particularly easy to differentiate the keypress EMI signatures in a keypad interface in which the logical values of each signal included in a set of keypad driver signals (e.g., scanner output signals) is the same. Each keypad switch activation results in different electromagnetic emissions depending upon the value of the signals at the switch intersections of a row and column. However, since each signal included in a set of keypad driver signals (e.g., scanner output signals) is the same there are a limited number electromagnetic emission signatures making association of a particular key with a particular EMI reading much easier. Thus, intercepting sensitive key sequences on a traditional keypad is relatively simple and later playback of those sequences is also a simple process.

What is required is a system and method that increases the difficulty of interpreting electromagnetic emissions from a keypad system. The system and method should reduce the probability of illicit association of electromagnetic emissions with sensitive key sequences.

SUMMARY OF THE INVENTION

The present invention is a system and method that increases the difficulty of interpreting electromagnetic emissions from a keypad system. The system and method reduces the probability of sensitive key sequences being illicitly associated with electromagnetic emissions by facilitating randomness in the electromagnetic emissions associated with a particular key activation. In one embodiment of the present invention, a keypad scanner circuit utilizes a set of digital values that varies over time and the bits included in a digital word applied to a keypad attribute (e.g., a row or column. The set of random digital values are stored in a register file and are sequentially sent to the column pads and row pads. In one embodiment of the present invention, the set of digital values is generated by either software or a hardware randomizer, and loaded into the register file. The keypad security system of the present invention drives the varying strong keypad driver word to an attribute of a keypad switch matrix (e.g., the rows or columns), applies a weak driver word to the opposing attribute of the keypad switch matrix, retrieves a resulting word from the opposing attribute of the keypad switch matrix, and interprets the results to determine if a switch included in a keypad system was activated (e.g., is on or off).

To support random bit values on each of the matrix attributes, the weak keypad driver signals are independently configured. In one embodiment of the present invention, the weak driver signals are independently pulled up or pulled down. In one exemplary implementation of the present invention, the weak driver signals are independently precharged to a logical value by temporarily enabling the respective opposing attribute driver (e.g. a row or column driver). When the opposing attribute driver enable signal is unasserted after a short temporary duration, a bus keeper coupled to the opposing attribute holds the weak signal. The independent weak signals remain the same unless overcome by a strong driver signal due to a keypad switch activation. In one embodiment of the present invention, a comparison of the weak driver signal value and the strong driver value provides an indication of a keypad switch activation. In another exemplary implementation, a comparison of a resulting signal value during two sample cycles is performed. In one exemplary implementation, the random values in the register file are updated at random times or by significant events such as key presses.

DESCRIPTION OF THE DRAWINGS

FIG. 1A is a block diagram illustration of a typical keypad system in which a switch is located at each intersection of the four by four switch matrix array.

FIG. 1B is a state diagram for a traditional keypad system.

FIG. 7 is a table comprising one exemplary set of digital values that are sequentially sent to the column outputs and row outputs in one embodiment of the present invention.

DETAILED DESCRIPTION

Reference will now be made in detail to the preferred embodiments of the invention, a keypad security system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

A present invention keypad security system varies the electromagnetic emissions associated with keypad switch EMI signature sequences of a keypad system by varying the signals applied to a keypad row or column. The keypad security system of the present invention applies a varying keypad driver word onto a keypad switch matrix, retrieves a row or column resulting word from the keypad switch matrix, and interprets the results to determine if a switch included in a keypad system changed is activated (e.g., is on or off). In one embodiment of the present invention the varying keypad driver word varies over both time and bits included in the keyword.

Figure 2:
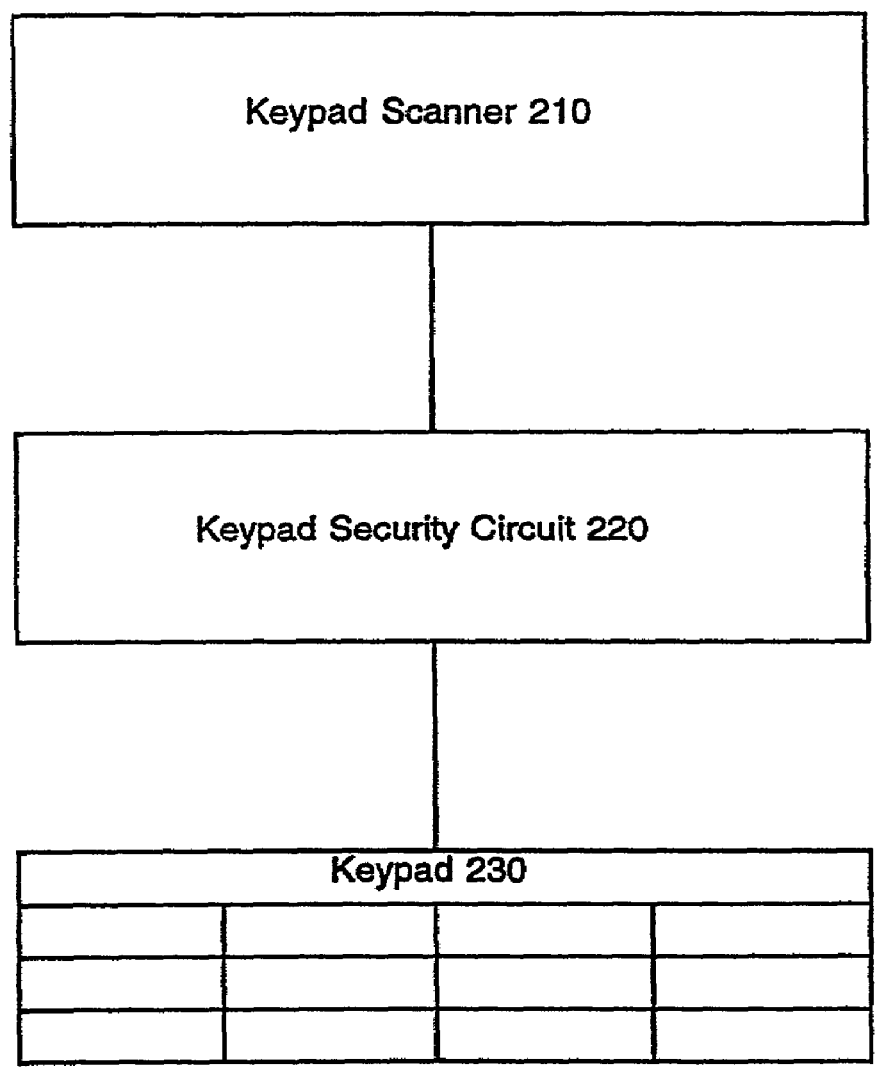
FIG. 2 is a block diagram of keypad security system, one embodiment of the present invention.

FIG. 2 is a block diagram of keypad security system 200, one embodiment of the present invention. Keypad security system 200 comprises a keypad scanner circuit 210, a keypad security circuit 220 and a keypad matrix 230. Keypad scanner circuit 210 is coupled to keypad security circuit 220 which is coupled to keypad matrix 230. Keypad scanner circuit 210 is adapted to control keypad scan operations and detect when the signals indicate an activation or change in the status of a switch included in keypad matrix 230. Keypad security circuit 220 facilitate changes in keypad driver signals that increase the difficulty of keypad switching sequence interpretation by unauthorized EMI interception. In one embodiment of the present invention, keypad security circuit 220 implements security measures that alter electromagnetic emission sequences from a keypad switch matrix in a manner that introduces randomness to emission patterns and makes it harder to correlate a particular electromagnetic emission with a particular key manipulation. Keypad matrix 230 comprises keys and corresponding switches that provide paths for conducting signals between columns and rows of a switch matrix in response to activation of the switches (e.g., turned on, turned off, opened, closed, etc.). In one embodiment of the present invention, the switches are activated as a result of physical manipulation of the keys (e.g., pressed).

In one embodiment of the present invention, keypad security system 200 facilitates increased security for information input operations by utilizing digital values that randomly vary over both time and the bits in each digital keypad driver word applied to keypad rows or columns. In one exemplary implementation of the present invention, the set of randomly varying digital values sent to the column pads or row pads (e.g., in place of set traditional scanner column outputs and row outputs) are stored in a register file (e.g., a file of a keypad register included in a scanner). In FIG. 2 the varying scanner column outputs and varying scanner row outputs are shown as separate bits from the register file. In one embodiment of the present invention, the same bits from the register file provide both the varying scanner column drive signals and varying scanner row drive signals. In one embodiment of the present invention the set of digital values is generated elsewhere in the system by either software or a hardware randomizer, and loaded into the register file. In one exemplary implementation of the present invention, the register file is updated at random times or by significant events such as keypresses.

Keypad matrix 230 is defined by two sets of matrix attributes, rows and columns. Each intersection of a first set matrix attribute and a second set matrix attribute (e.g., the intersection of a row and column) includes a switch. To establish a preliminary keypad state, a strong signal at a varying logical value is applied to the first set of matrix attributes (e.g., the columns) and a weak signal at another logical value is applied to the second set of matrix attributes (e.g. the rows). When a keypad switch at the intersection of two matrix attributes is activated, an electrical path is established between the first matrix attribute and the second matrix attribute (e.g., between a row and column) and the strong signal overrides the weak signal. Each of the second set of matrix attributes (e.g., the rows) is sampled and a determination is made if a strong signal has overcome a weak signal by analyzing if there is a change in the logical value of the weak signal on one of the second set of matrix attributes (e.g., the rows). A change in the logical value indicates a switch on one of the second set of matrix attributes (e.g., a row) is activated. After determining a switch on one of the second set of matrix attributes (e.g., a row) is activated, an analysis is made regarding which of the first set of matrix attributes is associated with the active switch.

In one embodiment of the present invention, the analysis regarding which of the first set of matrix attributes (e.g., a column) is associated with the activated switch is similar to the determining which switch on one of the second set of matrix attributes (e.g., a row) is activated. Strong signals at a varying logical value are applied to each of the second set of matrix attributes (e.g., the rows) and weak signals are applied to the first set of matrix attributes (e.g., the columns). Each of the first set of matrix attributes (e.g., the columns) is sampled and a determination is made if a strong signal has overcome a weak signal by analyzing if there is a change in the logical value of the weak signal on one of the first set of matrix attributes (e.g., the rows). A change in the logical value indicates a switch on one of the first set of matrix attributes (e.g., a column) is activated. After determining a switch on one of the first set of matrix attributes (e.g., a column) is activated a correlation as to which key is activated is made by keypad scanner 210.

In one embodiment of the present invention, keypad security circuit 220 is coupled between a standard digital keypad scanner and standard keypad matrix. This allows the standard keypad scanner to operate essentially unchanged while providing a level of security at the otherwise electromagnetically "exposed" traditional keypad interface. Even though the scanner output signals are altered by the keypad security circuit to vary over time, the logical value indications provided by the keypad security circuit as keypad scanner inputs do not change. For example, if a logical one indicated a switch on a row is activated in the standard scanner input signal then keypad security circuit handles interpretation of the varying resulting keypad signals and makes appropriate adjustments so that scanner input signal indication that a switch on a row is activated is still a logical one.

Figure 3:
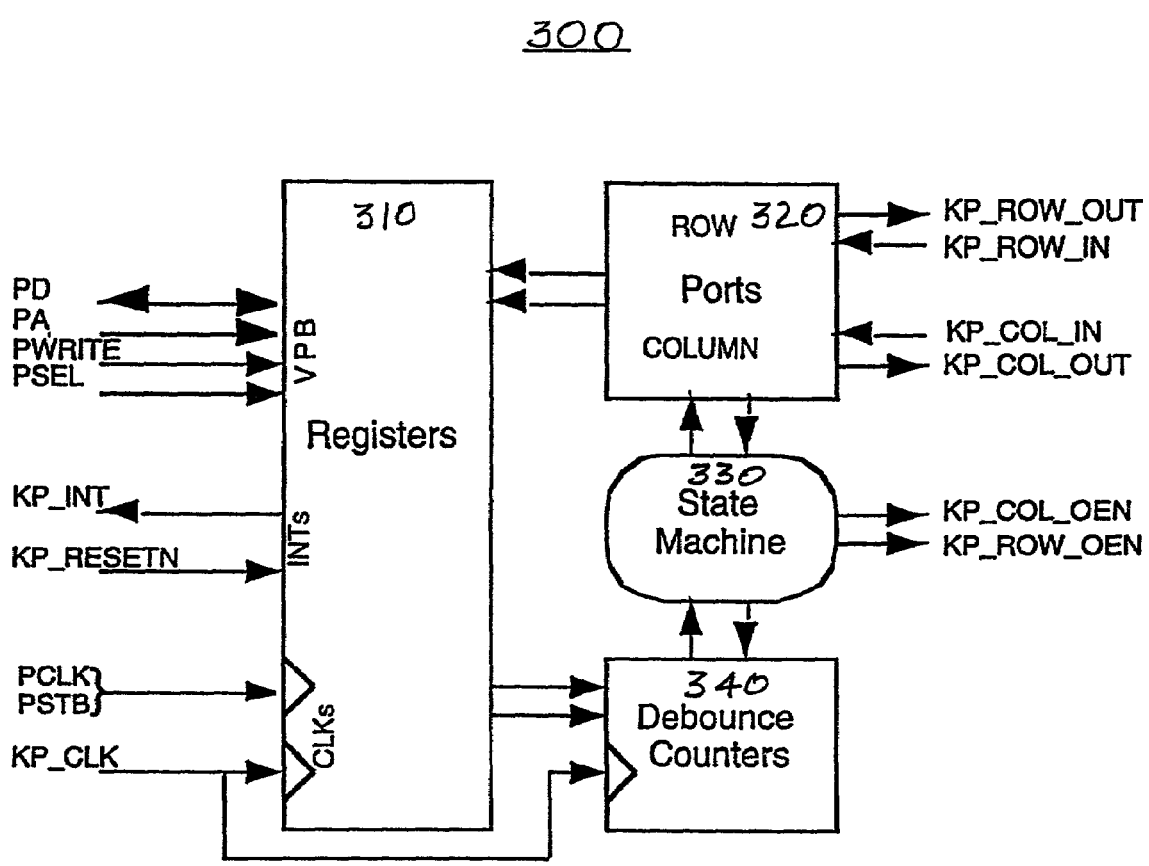
FIG. 3 is a block diagram of keypad scanner 300, one embodiment of the present invention.

FIG. 3 is a block diagram of one embodiment of keypad scanner 210 comprising a keypad register 310, keypad interface ports 320, a keypad state machine 330, and a keypad debounce circuit 340. Keypad register 310 is coupled to keypad interface ports 320 and keypad debounce circuit 340 which are coupled to keypad state machine 330. Keypad register 310 provides an interface to a host processor (not shown) and stores information (e.g., varying keypad driver words). Debounce counter circuit 340 accounts for settling transitions of the switches between open and closed. State machine 330 controls the direction of keypad interface ports 320 with the scanner row and column output enable signals. State machine 330 also controls the reading of the scanner row input signals and scanner column input signals.

Figure 4:
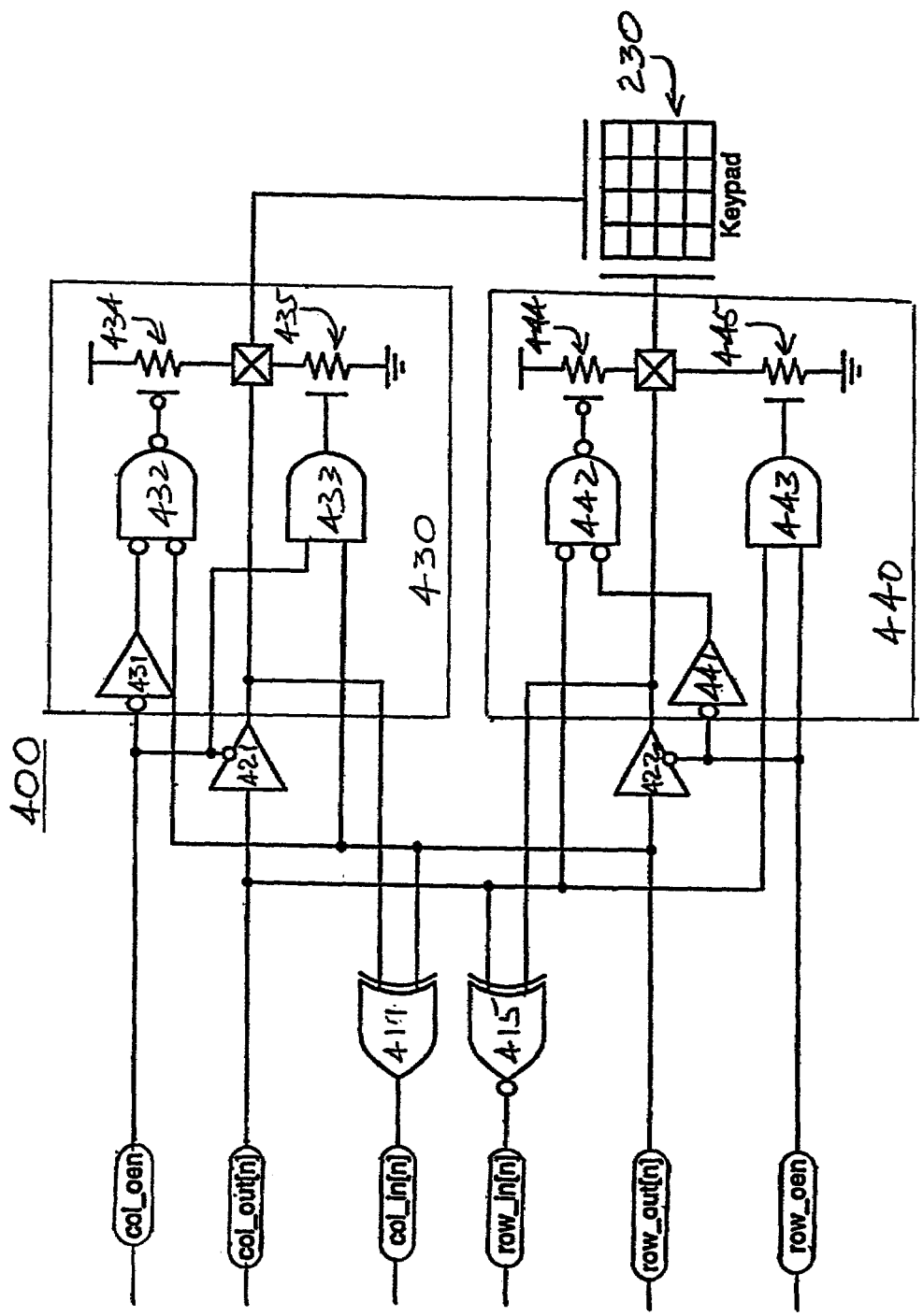
FIG. 4 is a block diagram of keypad security circuit 400, one embodiment of a present invention keypad security circuit.

FIG. 4 is a block diagram of keypad security circuit 400, one embodiment of a present invention keypad security circuit. Keypad security circuit 400 comprises a comparitor 410, a column driver 421, a row driver 422, a programmable column opposing signal constructor 430, a programmable row opposing signal constructor 440. Comparitor 410 is coupled to row driver 422 and column driver 421 which are coupled to programmable column opposing signal constructor 430 and programmable row opposing signal constructor 440, respectively. Comparitor 410 is adapted to perform a comparison of a signal on a column and a signal on a row. Column output driver 421 is adapted to drive a column strong driver signal on a column. Row output driver 422 is adapted to drive a row strong driver signal on a row. Programmable column opposing signal constructor 430 is adapted to provide a column weak driver signal that is logically opposite of the row strong driver signal driven by row output driver 422. Programmable row opposing signal constructor 440 is adapted to provide a row weak driver signal that is logically opposite of the column strong driver signal driven by column output driver 421.

In one embodiment of the present invention, a set of random digital values from a register file (e.g., keypad register 310) are sequentially sent to the column drivers and row drivers as a column output (col_out) signal during a first state of a keypad scanner algorithm and a row output (row_out) signal during a second state of a keypad scanner algorithm. In one embodiment of the present invention, opposing bit values on the rows or columns are independently pulled up or pulled down. When a column strong driver signal is a logical one value (e.g., a pulled up value), the corresponding row opposing weak driver signal has a logical zero value (e.g., a pulled down value). Conversely, when a column strong driver signal is a logical zero value, the corresponding opposing row weak driver signal is a logical one value. When a row strong driver signal is a logical one value (e.g., a pulled up value), the corresponding column opposing weak driver signal has a logical zero value (e.g., a pulled down value). Conversely, when a row strong driver signal is a logical zero value, the corresponding opposing column weak driver signal is a logical one value. To support this flexibility, in one embodiment of the present invention, programmable column opposing signal constructor 430 and programmable row opposing signal constructor 440 include both pull-ups and pull-downs that are independently enabled.

In one embodiment of the present invention, column driver 421 is enabled by the column output enable (e.g., col_oen) signal and the scanner column output signal from the register file operates as the column strong driver signals when scanning rows to detect which row includes an activated switch. The pull-ups and pull-downs of the programmable column opposing signal constructors are disabled to prevent excessive current leakage and to prevent contention with the column strong driver signal (e.g., the scanner column output signal). The rows are made scanner inputs by disabling the row drivers (e.g., row driver 422). In one exemplary implementation of the present invention, the row output enable signal from the keypad scanner is false (e.g., a logical zero) and the false row output enable signal also gates on the enable path to the row pull-ups (e.g., row pull up 444) and pull-downs (e.g., row pull down 445). When a row pull-up and pull-down enable path is gated on, the scanner column output signal determines whether the pull-up or the pull-down is enabled. In one embodiment of the present invention, the pull-up is enabled if the scanner column output signal is a logical zero and the pull-down is enabled if the scanner column output signal is a logical one. In one exemplary implementation of the present invention, the logical value of the weak default signal on the row pads is the opposite of the column strong driver signal logical value.

In one embodiment of the present invention, keypress detection is performed by binary comparison (e.g., in comparitor 410) of a row resulting signal with a column strong driver signal. In one exemplary implementation of the present invention, the output of a row detection comparison is a logical one when the row resulting signal equals the column strong driver signal and indicates a key on that row is pressed, and a logical zero when the row resulting signal is the same as the column strong driver signal, indicating no key on the row is pressed. In one embodiment of the present invention, the output from the comparitor is of the same form as expected by a standard keypad scanner from a standard digital interface.

Scanning columns to detect which column includes an activated switch is very similar to scanning rows to detect which row includes an activated switch. In one embodiment of the present invention, row driver 422 is enabled by the row output enable (e.g., row_oen) signal and the scanner row output signal from the register file operates as the row strong driver signals when scanning columns to detect which column includes an activated switch. The row pull ups and pull-downs of the programmable row opposing signal constructors are disabled. The columns are made scanner inputs by disabling the column output drivers and the programmable column opposing signal constructors pull-up and pull-down enable paths are gated on, allowing the scanner row output signal to enable either the pull-up or pull-down. The keypad column resulting signals are fed to the comparitors where they are compared to the row driver signals. In one exemplary implementation of the present invention, the output of a column detection comparison is a logical zero when the column resulting signal equals the row strong driver signal and a logical one when the column resulting signal does not equal the row strong driver signal. As with the row detection comparison, in one embodiment of the present invention the result is of the same form expected by a standard keypad scanner from a standard digital interface.

In one embodiment of the present invention the keypad interface uses digital signaling and an additional security feature of an analog nature is included. In one embodiment of the present invention a low voltage signaling is utilized instead of standard transistor to transistor logic (TTL) signaling. The low voltage signaling reduces the electromagnetic induction (EMI) fields making illicit detection more difficult. The present invention facilitates utilization of low voltage or other types of signaling when it is advantageous, but does not require low voltage signaling.

Figure 5:
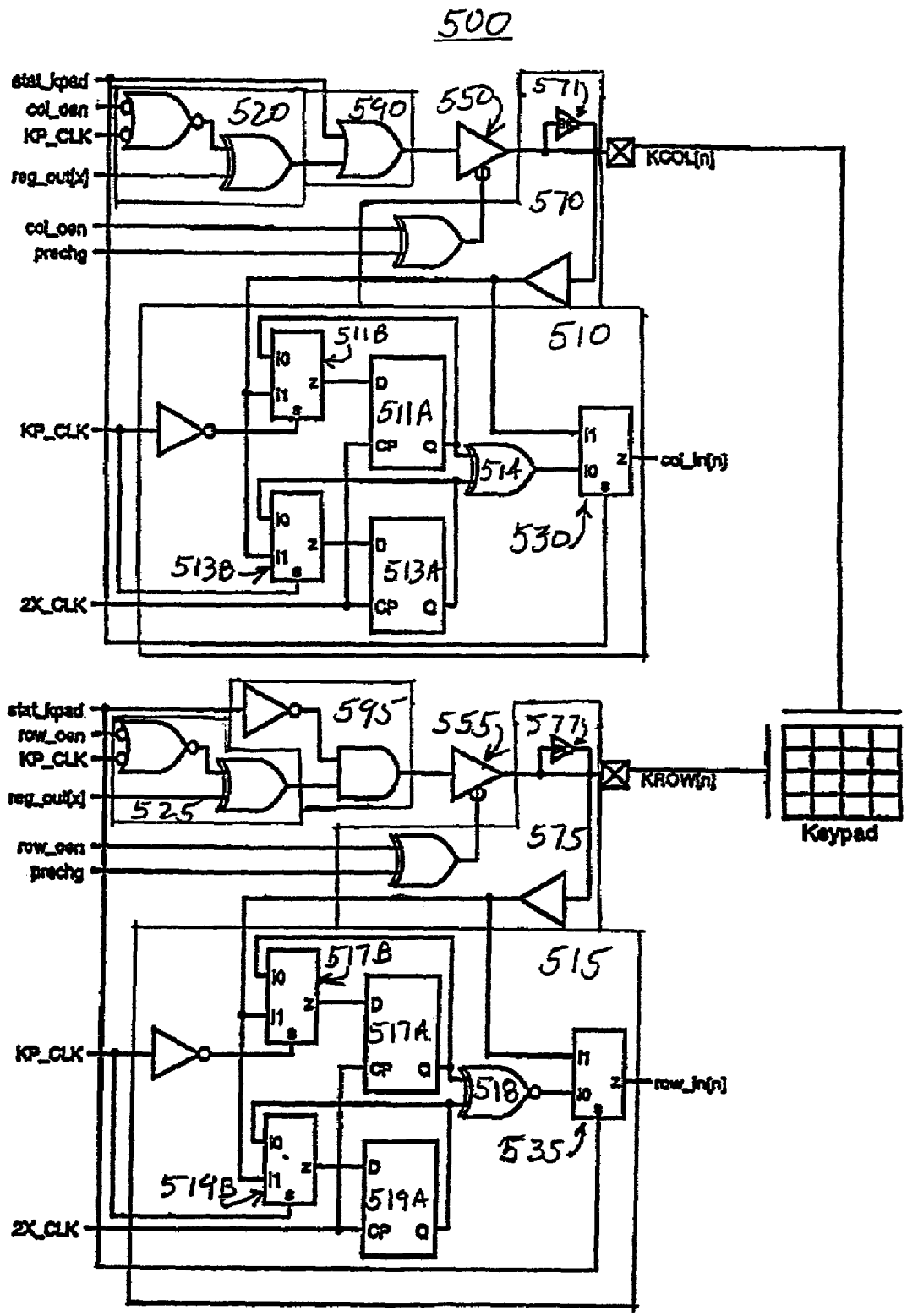
FIG. 5 is a block diagram of keypad security circuit 500 one embodiment of a present invention security circuit.

FIG. 5 is a block diagram of keypad security circuit 500, one embodiment of a present invention security circuit. Keypad security circuit 500 comprises column comparitor 510, row comparator 515, programmable column opposing signal constructor 520, programmable row opposing signal constructor 525, column driver 550, row driver 555, column precharge circuit 570, row precharge circuit 575, column static override circuit 590, and row static override circuit 595. Programmable column opposing signal constructor 520 is coupled to column static override circuit 590 which is coupled to column driver 550. Column driver 550 is coupled to column precharge circuit 570 which is coupled to column comparator 510. Programmable row opposing signal constructor 525 is coupled to row static override circuit 595 which is coupled to row driver 555. Row driver 555 is coupled to row precharge circuit 575 which is coupled to row comparator 515. Programmable column opposing signal constructor 520 and programmable row opposing signal constructor 525 are coupled to a keypad register (not shown).

The components of keypad security circuit 500 cooperatively operate to facilitate application of randomly varying keypad driver signals and increase the difficulty of interpreting electromagnetic emissions associated with keypad switch activation. A keypad register (e.g., keypad register 310) stores and forwards a varying register output signal (reg_out). Programmable column opposing signal constructor 520 and programmable row opposing signal constructor 525 determine if the varying register output signal is forwarded at the same logical value to a switch matrix (e.g., column or row) or if the signal is inverted first. Column static override circuit 590 and row static override circuit 595 determine if the varying register output signal is forwarded to a switch matrix attribute or if a signal with a static logic value is forwarded. Column driver 550 and row driver 555 drive a column driver signal and a row driver signal onto a column and row respectively. Column precharge circuit 570 and row precharge circuit 575 hold a precharge when column driver 550 and row driver 555 are disabled respectively. Column comparator 510 and row comparator 515 compare the value of a driver signal sent out on a column or row with a logical value of a resulting keypad signal that is scanned from the column or row.

In one embodiment of the present invention, the driver word signals are independent of each other. The keypad strong driver word is driven on to either the columns or rows of the keypad switch matrix. The pre-charge bus keeper (e.g., 171 or 177) included in the keypad security circuit supports random logical values on each bit in an opposing keypad weak driver word. The signals of the opposing weak keypad driver word signals are independently pre-charged to a logical value by temporarily enabling a respective opposing row or column driver. When the opposing row or column driver is disabled a bus keeper holds the pre-charged weak driver signal logical value. In one exemplary implementation of the present invention, the bus keepers of system 500 provide a similar function to programmable pull-ups and pull-downs of system 400.

When a column pad is coupled to a row pad due to a keypress and the strong resulting keypad signal is different than the pre-charged value held by the bus keeper, the resulting strong signal over-rides the weak bus keeper signal. In one embodiment of the present invention, the opposing driver signal iterates the pre-charge and sample cycle with both polarities of a pre-charged value enabling the present invention to detect both polarities of a driver signal. In one exemplary implementation of the present invention, the sampling of the resulting keypad signals use a clock that is twice the frequency of the keypad clock signal (KP_CLK). In one embodiment of the present invention, the keypad security sampling clock signal (2X_CLK) is derived by inverting the keypad clock signal (KP_CLK) and dividing by two so that the rising edge of KP_CLK is synchronous with the falling edge of 2X_CLK. Since the weak driver signals transition on the rising edge of KP_CLK and the keypad resulting signals are sampled on the rising edge of 2X_CLK, which occurs at the half period of 2X_CLK after the rising edge of KP_CLK, the weak driver signals are pre-charged and sampled within each half period (e.g., low period) of 2X_CLK. In one embodiment of the present invention, a pre-charge pulse (prechg) is generated within each low period of 2X_CLK and is issued to control the pre-charge of the inputs.

In one embodiment of the present invention, the weak driver signals are pre-charged during the first part of the low period of 2X_CLK and then sampled after the low period of 2X_CLK with the rising edge of 2X_CLK. The pre charge logical value is the inversion of the random scanner output signal logical value during the high period of KP_CLK and is the same logical value of the random scanner output signal during the low period of KP_CLK. In one embodiment of the present invention, the two values are alternately sampled by two flip flops clocked by 2X_CLK. The outputs of the flip flops are equal at their rising edge of KP_CLK if a key was pressed and unequal if a key was not pressed.

In one embodiment of the present invention, when scanning rows to detect which row includes an activated switch, column driver 550 is enabled by the column output enable (e.g., col_oen) signal and the register file output signals (e.g., scanner column output signals) operate as the column strong driver signals. In one exemplary implementation of the present invention the column output enable signal (col_oen) is active (low) and the register output signal (reg_out) is passed to column driver 550 non-inverted. The low col_oen signal also enables the output driver during the low inactive periods of the precharge signal. Since the rows are operating as scanner inputs and the row output enable signal is not asserted (e.g., high) the inversion of the reg_out signal is controlled by KP_CLK, and the enable of the column driver occurs during the high periods of the precharge signal. During the high periods of precharge, the inverted value of the register out signal (reg-out) is driven out if KP_CLK is high and the non-inverted value of reg-out is driven out if KP_CLK is low. During the low period of precharge, the output driver is disabled and the weak default value on the row pads is maintained by the bus keepers.

The state of the row pad is sampled twice during the KP_CLK period. In one embodiment of the present invention, the state of the row pad is sampled by two flip flops clocked by 2X_CLK. During the high period of KP_CLK, when the row driver signal has been pre-charged to the inverted logical value of reg_out, the row first sample cycle flip flop (e.g., flip flop 517A) is in a hold state and the row second sample cycle flip flop (e.g., flip flop 519A) is in a sample state. This is due to the row sample cycle flip flop's multiplexer (e.g., multiplexer 517B) selecting the output to the row first sample cycle flip flop, while the row second sample cycle flip flop's multiplexer (e.g., multiplexer 519B) is selecting the pin input. During the low period of KP_CLK, when the row driver signal has been precharged to the non-inverted logical value of reg_out, the row first sample cycle flip flop (e.g., 517A) is in a sample state and the row second sample cycle flip flop (e.g., 519A) is in a hold state. If there is no keypress, then the flip flops (517A and 519A) sample the precharge values and therefore have opposite states after the low period of KP_CLK. If there is a keypress, the column output value is driven onto the row (overriding the weak precharge signal) in both sample phases and the logical value stored by both flip flops (e.g., 517A and 519A) are therefore the same after the low period of KP_CLK.

After both row sampling cycles during a KP_CLK period, a comparison of the states of the row first sample cycle flip flop (e.g., 517A) and the row second sample cycle flip flop (e.g., 519A) is performed. In one embodiment of the present invention the comparison is done by an exclusive not OR gate (e.g., XNOR 518), whose output is zero when the two flip flops are opposite in state and one when the two flip flops are in the same state. The scanner row input signal (row_in) is therefore high (assuming the stat_kpad signal is low) at the rising edge of KP_CLK when a keypress has occurred. In one exemplary implementation of the present invention, the result is of the same form as expected by a standard keypad scanner from a standard digital keypad matrix interface.

Scanning columns to detect which column includes an activated switch is very similar to scanning rows to detect which row includes an activated switch. Row driver 550 is enabled by the row output enable (e.g., col_oen) signal and the register file output signals (e.g., scanner column output signals) operate as the row strong driver signals. The columns are made scanner inputs by disabling the column output enable, allowing the high period or precharge signal to control the driver enable and KP_CLK to control the inversion of the register file output signal (reg_out). The pre-charging of the column driver signals and the use of the bus keepers to hold the pre-charged value during the sampling period is fundamentally the same as for the rows. The sampling of the column resulting signals into two flip flops, first into a column first sample cycle flip flop (e.g., flip flop 511A) when KP_CLK is high and then into a column second sample cycle flip flop (e.g., flip flop 513A) when KP_CLK is low, is to the sampling of the row resulting signals. The comparison of the column sample cycle flip flops (e.g., 511A and 513A) is performed after the two samples cycles during a KP_CLK period. In one embodiment of the present invention, the comparison is performed with an exclusive OR gate (e.g., XOR514) so that the scanner input signal is a zero when the column sample cycle flip flops (e.g., 511A and 513A) are the same. The scanner column input signal (co_in) is therefore low at the rising edge of KP_CLK when a keypress has occurred. As with the row inputs, in one embodiment of the present invention, the result is of the same form expected by a standard keypad scanner from a standard digital interface.

In one embodiment of the present invention, the secure keypad interface provides a static data mode of operation which is enabled by the assertion of static keypad signal (e.g., stat_kpad). In this mode, the column driver signals are maintained at one logical value (e.g., high) and the row driver signals are maintained at another logical value (e.g., low). The varying keypad security information (e.g., the data from the register file) is ignored in this mode and the interface acts in the manner associated with a traditional non-secure keypad scanner.

Special handling of the idle state is supported in the static data mode. The idle state is indicated by the assertion of an idle state (e.g., idle_state) signal and occurs when no key is pressed and the keypad scanner is waiting for a new keypress. When the idle state is entered, the row strong driver signals are enabled as before. The column weak driver signals are pre-charged and sampled as in other states, however the keypad scanner is monitoring only the state of the keypress signal, which is the logical OR of all the column resulting signals. When the static data mode is enabled, the column pins are constantly low until a key is pressed, The keypress detection can therefore be done directly on the pin signals instead of the outputs of the security logic. The column driver signals are selected to be from the pins instead of the security logic when the stat_kpad signal is asserted. The advantage of using the pin signals directly is that asynchronous keypress detection is possible, which allows keypress detection to be used for system wakeup events. The static configuration bit (stat_kpad) switches the outputs from random bits to static ones on the column pins and static zeroes on the row pins. This allows keypress detection to occur while in a low power state.

Figure 6A:
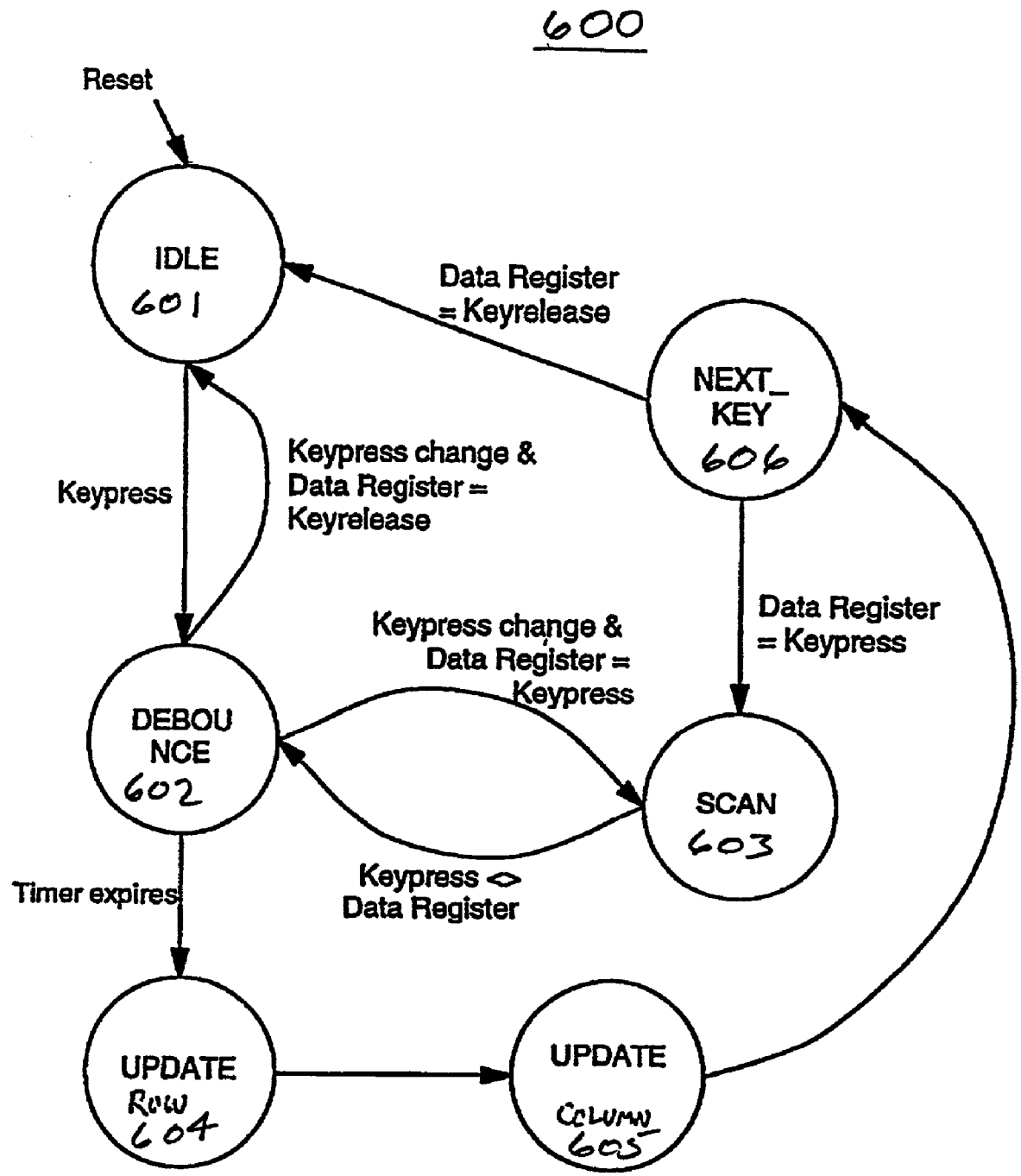
FIG. 6A is a state diagram for keypad security circuit 500, one embodiment of the present invention.

FIG. 6A is a state diagram for keypad security circuit 500, one embodiment of the present invention. In idle state 601 keypad security circuit 500 is in an idle state waiting to detect an indication of a keypress. In debounce state 602 keypad security circuit 500 is performing a debounce of a signal indicating there is a keypress. In static scan state 603 keypad security circuit 500 performs a keypad matrix scan with set data signals instead of varying data signals if a static keypad signal (e.g., stat_kpad) indicates a scan with static values instead of varying values. In row update state 604 keypad security circuit 500 determines which row the activated switch is included in. In column update state 605 keypad security circuit 500 determines which column the activated switch is included in. In next key state 606 keypad security circuit 500 determines if there is an indication another keypad switch has been activated.

Figure 6B:
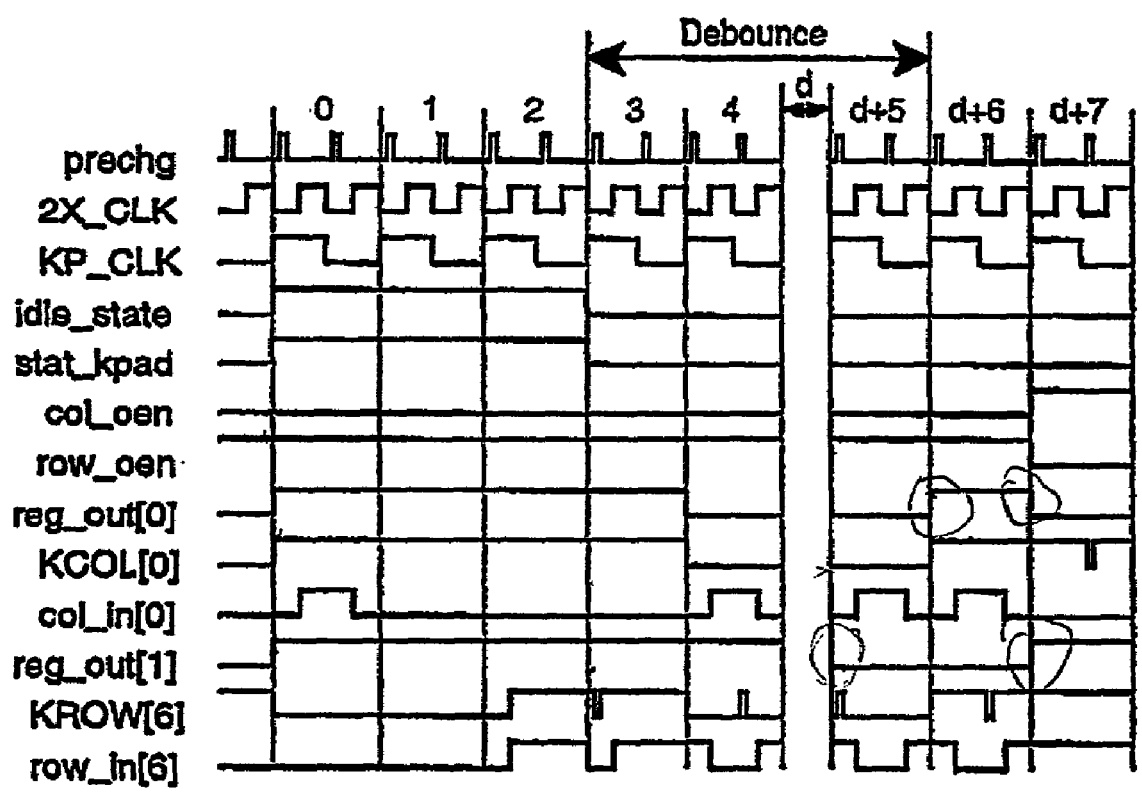
FIG. 6B is a timing diagram illustrating a sequence of a keypress from the idle state through debouncing and register update in one exemplary implementation of the present invention.

The timing shown in FIG. 6B illustrates an example sequence of a keypress from the idle state through debouncing and register update. The idle state is indicated by the assertion of the idle_state signal and begins with cycle 0. The debounce state is indicated by the "Debounce" notation in the figure and occupies d+3 cycles, where d is the number of cycles in the timing diagram "output". The two scan sample update states immediately follow the debounce state in cycles d+6 and d+7. The keypress shown connects column zero signal (KCOL[0]) to row six signal (KROW [6]). In the following discussion, the quadrants of the cycles are referred to in the form "cycle c.q", where c is the cycle number and q is the quadrant.

In the present example timing diagram of FIG. 6A, only the two least significant bits of random data from an 8 bit wide register file are shown. The example binary data shown in the timing diagram is [11, 10, . . . , 00, 10] for cycles [3, 4, . . . , d+5, d+6, d+7]. In the timing diagram, the two varying keypad driver bits are shown as reg_out[0] and reg_out[1]. The data is referred to as V[b] where [b] is the bit position (0 or 1), and V is the value of the bit (H=high, L=low) in that cycle. In this example, the random data is static during idle and constant in cycles 0 through 3.

The idle state is entered on the rising edge of KP_CLK. In the idle state, the keypad controller (e.g., a keypad scanner) asserts col_oen and de-asserts row_oen while waiting for a high in any of the scanner row inputs signals [7:0]. In one exemplary implementation of the present invention, the change of the register file data occurs at the same time the idle state is entered, and the assertion of the stat_kpad signal forces KCOL [0] high (e.g., a logical one value) and causes precharge of KROW[6] to go low (e.g., a logical zero value). In cycle 0.1, the bus keeper is pre-charged to the forced value of a low. The pre-charge occurs again in the cycle, but only as a harmless artifact of the present exemplary design. Cycle 1 shows no activity and the system remains in the idle state.

A keypress occurs in cycle 2 and the high driven out on KCOL[0] is connected to KROW[6] and through the row idle state multiplexer 535 to the scanner row input signal (e.g., row_in [6]). The keypress is seen by the keypad controller at the start of cycle 3, which causes the controller to leave the idle state and enter the debounce state. The idle_state signal goes false as a result of the state change, and the stat_kpad signal is coincidentally deasserted, but the register file output does not change until the next KP_CLK.

In the debounce state, the column remains in strong driver mode and the row in weak driver mode (e.g., the rows are scanner inputs), as seen by col_oen and row_oen holding their respective low and high values. The KCOL[0] signal now changes from the forced high level to H[0], which happened to also be high during cycle 3. The row_in[6] signal changes to a low when the low idle_state signal switched row idle state multiplexer 535 to the comparison of the row sample cycle flip flops (e.g., 517A and 5129A). Since only the row first sample cycle flip flop (e.g., 517A) has been updated to a one (at the end of cycle 2,3) with the KROW[6] signal, the high on KP_CLK causes the precharge value to be the inversion of H[1], (e.g., a low of zero logical value). After the pre-charge period, the high column strong driver signal once again dominates and KROW[6] goes high during the remainder of the low period of 2X_CLK. At the next rising edge of 2X_CLK (at the end of cycle 3.1), the row second sample cycle flip flop (e.g., 219A) is updated to a one and row_in[6] signal changes back to a high. During cycle 3.3 the weak driver signal input is precharged to the value of H[1], so KROW[6] remains high. KROW[6] is sampled at the end of cycle 3.3. by the row first sample cycle flip flop (e.g., 217A), but the scanner row input signal row_in[6] remains unchanged since the flip flop value was already a one. Finally, at the end of cycle 3, row_in[6] is clocked into the keypad controller by KP_CLK and the register file is advanced to the next output, causing the random data to change.

During cycle 4, KCOL[0] follows L[0] and changes to a low. At the end of cycle 4.1, the column second sample cycle flip flop (e.g., 513A) is updated with the new value on KCOL[0]. This causes the two column sample flip flops (e.g., 511A and 513A) to be opposite and the resulting comparison XOR (e.g., 514) to be a high, as shown by the scanner input signal col_in[0] in FIG. 6. The next rising edge of 2X_CLK at the end of cycle 4.3 will cause the column second cycle flip flop (513A) to be updated, making the two column sample cycle flip flops (e.g., 511A and 513A) equal again and restoring the value of the scanner column input signal col_in[0]. During cycle 4.1, the row input is precharged to the inversion of H[1], making it low, and then in sample mode KCOL[0] is driven into KROW[6], making it a low. KROW[6] is sampled into the row second sample cycle flip flop (e.g., 519A) at the end of cycle 4.1, causing the row sample cycle flip flops (e.g., 517A and 519A) to be opposite and the scanner row input signal row_in[6] to be low. Cycle 4.3 first pre-charges KROW [6] with the value of H[1], changing KROW[6] to a high, then restores the low value of KCOL[0] to KROW[6]. At the end of cycle 4.3, the row first sample cycle flip flop (e.g., 517A) clocks in KROW[6], changing the flip flop to a zero and row-in[6] back to a high. Finally, KP_CLK clocks in row-in[6] at the end of cycle 4 and since row_in [6] is still high in the present exemplary timing diagram, debouncing continues.

The last debounce cycle d+5 starts with a change in the random data from H[0] and H[1] to L[0] and L[1]. The change to L[0] causes a high pulse on the scanner column input signal col_in, as discussed in cycle 4. During cycle d+5.1, KROW [6] is precharged to the inversion of L[1], making it high, then driven to a low by KCOL[0]. At the end of cycle d+5.1, the row second sample cycle flip flop (e.g., 519A) clocks in KROW[6] and changes from a one to a zero state which causes scanner row input signal row_in[6] to change to a low. During cycle d+5.3, KROW[6] is pre-charged to the value of L[1], making it low, then driven low by KCOL[0]. At the end of cycle d+5.3, the row first sample cycle flip flop (e.g., 517A) clocks in KROW[6], changes from a one to a zero, and causes the scanner row input signal row_in[6] to change back to a high. Finally, KP_CLK clocks in row_in[6] at the end of cycle d+5. Since row_in[6] is still a high, and the debounce counter has expired, the keypad controller moves from the debounce state to the update state.

The update state in cycle d+6 begins with a change from L[0] to H[0]. Similarly to cycle d+5, the change to H[0] causes a high pulse on col_in[0]. During cycle d+6.1, KROW[6] is precharged high by the inversion of L[1], making it high, then driven high by KCOL[0]. At the end of cycle d+6.1 the row second sample cycle flip flop (e.g., (513A) clocks in KROW[6], changes from a zero to a one, and causes the scanner row input signal row_in[6] to change to a low. During cycle d+6.3, KROW[6] is pre-charged to the value of L1], making it low, then once again driven high by KCOL[0]. At the end of cycle d+6.3, the row first sample cycle flip flop (e.g., 511A) clocks in KROW[6], changes from a zero to a one, and causes row_in[6] to change back to a high. Finally, KP_CLK clocks in row_in[6] at the end of cycle d+6 and updates the row data register with it.

The second update cycle d+7 starts with a change from H[0] to L[0], and from L[1] to H[1]. Also, the columns are switched to input mode and rows to output mode, causing the column enable signal (col_oen) to go high and row enable signal (row_oen) to go low. Since row_oen is now asserted, KROW[6] is driven with the non_inverted value of H[1] (e.g., it is driven high). During cycle d+7.1, KCOL[0] is precharged to the inversions of L[0], making it high, then driven high by KROW[6]. At the end of cycle d+7.1, the column second sample cycle flip flop (e.g., 513A) clocks in KCOL[0] and remains a one while col_in[0] remains low. During cycle d+7.3, KCOL[0] is precharged to the value of L[0], making it low, then driven high by KROW[6]. At the end of cycle d+7.3, the column first sample cycle flip flop (e.g., 511A) clocks in KCOL[0], remains a one, and col_in [0] remains low. Finally, KP_CLK clocks in col_in[0] at the end of cycle d+7 and updates the column data register with it.

FIG. 7 is a table comprising one exemplary set of digital values that are sequentially sent to the columns and rows in one embodiment of the present invention. The set of digital values are from a register file (e.g., a file included in keypad register 310) and randomly vary over both the sequence of bits in each digital word and over time. In one embodiment of the present invention the column pads are coupled to corresponding bits from the register file and the row pads are coupled to a mirror of the corresponding bits from the register file. For example, the column bits [0, 1, 2, 3, 4, 5, 6, 7] are coupled in a non-mirrored order to register file bits [0, 1, 2, 3, 4, 5, 6, 7] and the row bits [0, 1, 2, 3, 4, 5, 6, 7] are coupled in a mirrored order to register file bits [7, 6, 5, 4, 3, 2, 1, 0]. The mirroring provides fuller usage of the random data bits when the keypad is equal to or less than 8 bits wide on either the column or row interfaces. In one exemplary implementation of the present invention the set of digital values is generated elsewhere in the system by either software of a hardware randomizer, and loaded into the register file. In one embodiment of the present invention, the register file is updated at random times or by significant events such as keypresses.

In one embodiment of the present invention, the register file address is generated by a linear feedback shift register (LFSR) that changes its output at the rising edge of the keypad clock (KP-CLK). In one exemplary implementation of the present invention the LFSR is 16 bits wide and provides 4 of 16 bits as the register file address. Since the LFSR is 16 bits wide, the addressing sequence will not repeat for a period of 65,536 clocks. To support low power states, the LFSR can be disabled by writing an enable LFST (ENLFST) configuration bit to zero. The LFSR sequencing stops and the output remains constant.

In one embodiment of the present invention, a circuit is a 16-bit pseudo-random sequence generator (lfsr16_prn__12) which provides the varying digital values sent to keypad switch matrix columns and rows. An active low asynchronous reset pin (CDN) is provided and is an acronym for "Clear Direct Not". Upon assertion of the CDN pin, the output of the flip-flops will go to 0×1. An active high pin such as a LFSR enable (LFSTEN) pin is provided and enables parallel data load capability. Parallel data load mode is selected if LOAD is high and the DATAIN pins (16-bit parallel data load input pins) are provided. Some embodiments of the present invention have various LFSR operations with a specific order of precedence. In one exemplary implementation of the present invention async reset, parallel data load, lfsr enable is the order of precedence from high to low.

Figure 8:
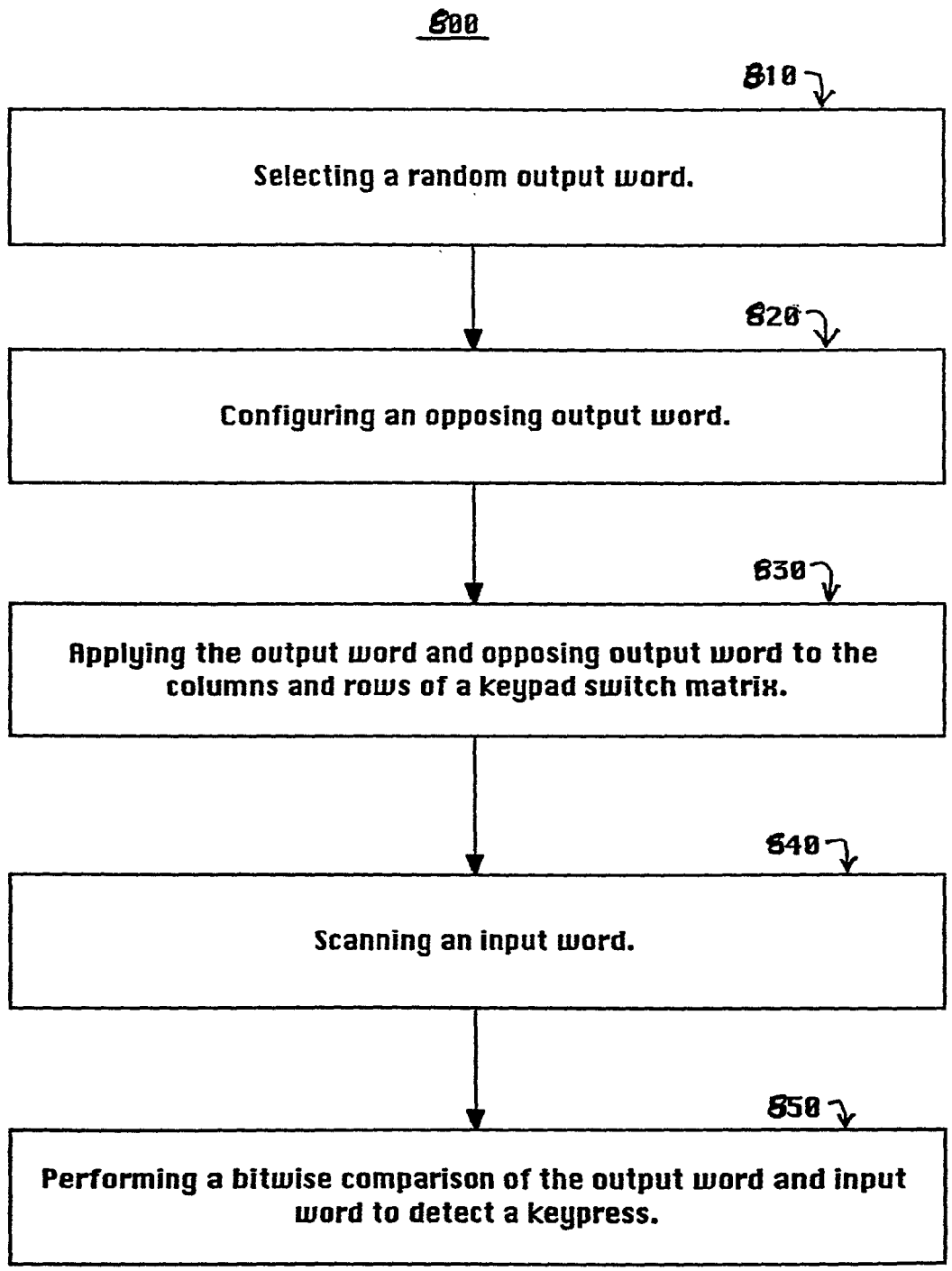
FIG. 8 is a flow chart of keypad security method 800, one embodiment of the present invention.

FIG. 8 is a flow chart of keypad security method 800, one embodiment of the present invention. Keypad security method 800 alters the electromagnetic signature sequences of a keypad system by randomly varying the signals applied to a row or column. In one embodiment of the present invention, keypad security method 800 applies a varying keypad driver word onto a keypad switch matrix, retrieves a resulting keypad scan word, and interprets the resulting logical values of a keypad scan word to determine if a switch included in a keypad system changed state (e.g. is on or off). In one embodiment of the present invention the varying keypad driver word varies over both time and bits included in the keyword.

In step 810 a varying strong signal driver is applied to a first attribute of a keypad switch matrix. In one embodiment of the present invention, the first attribute of the keypad switch matrix is a column and in another embodiment it is a row. In one exemplary implementation of the present invention, the varying driver signal is one of a set of digital values that randomly varies over time and the bits in a digital keypad driver word. The varying strong driver signal is generated by a randomizer and loaded into a register file in one exemplary implementation of the present invention. The register file is updated at random times or by significant events such as key presses.

In step 820 a varying weak driver signal is applied to a second attribute of a keypad switch matrix. In one embodiment of the present invention the second attribute of the keypad switch matrix is a column and in another embodiment it is a row. A pull-up and a pull-down are utilized to provide the weak driver signal to the second attribute of a keypad switch matrix and the pull-up and pull-down are independently enabled in one embodiment of the present invention. In one embodiment of the present invention the varying weak driver signal is pre-charged to a particular value. In one exemplary implementation of the present invention, pre-charged varying weak driver signal is held in a storage circuit (e.g., a bus keeper). In one embodiment of the present invention the varying weak driver signal is precharged twice in one keypad clock cycle. The varying weak driver signal is precharged to a first logical value during one portion of the keypad clock cycle and the varying weak driver signal is precharged to a second logical value during another portion of the keypad clock cycle.

In step 830 a resulting signal is retrieved from the second attribute of the keypad switch matrix. In one embodiment of the present invention the resulting keypad signal is sampled twice during the keypad clock cycle. In one exemplary implementation of the present invention the sampled resulting signals are stored in a column first sample cycle flip flop and column second sample cycle flip flop or a row first sample cycle flip flop and a row second sample cycle flip flop.

In step 840 a scanner input signal is forwarded indicating the activation status of a switch on the second attribute. In one embodiment of the present invention keypress detection is performed by binary comparison of the varying driver strong signal logical value on the first attribute of the keypad switch matrix and the resulting keypad signal logical value on the second attribute of the keypad switch matrix.

In step 850 a varying strong driver signal is applied to said second attribute of a keypad switch matrix.

In step 860 a varying weak driver signal is applied to said first attribute of a keypad switch matrix. In one embodiment of the present invention the varying weak driver signal is utilized to form a opposing attribute driver word (e.g. a row weak driver word in step 820 or a column weak driver word in step 860). In one implementation of the present invention the opposing weak driver word is bit wise opposite of the strong driver word. For example, each bit in the sequence of the weak driver word is inverted on a bit wise basis from the strong driver word.

In step 870 a resulting signal is retrieved from said first attribute of the keypad switch matrix. In one embodiment of the present invention the resulting keypad signal is sampled twice during the keypad clock cycle. In one exemplary implementation of the present invention the sampled resulting signals are stored in a column first sample cycle flip flop and column second sample cycle flip flop or a row first sample cycle flip flop and a row second sample cycle flip flop.

In step 880 a scanner input signal is forwarded indicating the activation status of a switch on said first attribute. In one embodiment of the present invention switch activation (keypress detection) is performed by binary comparison of a resulting signal with a strong driver signal. In one embodiment of the present invention, switch activation is In one exemplary implementation of the present invention the result of a performed by binary comparison of a resulting signal logical value during a first sample cycle and the resulting signal logical value during a second sample cycle.

In one exemplary implementation of the present invention, a row detection comparison is a logical one when the row resulting signal equals the column strong driver signal and indicates a key on that row is pressed, and a logical zero when the row resulting signal does not equal the column strong driver signal, indicating no key on the row is pressed. The result of a column detection comparison is a zero when the column resulting signal equals the row strong driver signal and a logical one when the column resulting signal does not equal the row strong driver signal. In another embodiment of the present invention, the result of a comparison is a logical value (e.g., a logical one) that indicates a keypad switch is activated (a key is pressed) if the resulting values sampled during the two sample cycles are the same. In one embodiment of the present invention, the result is of the same form expected by a standard keypad scanner from a standard digital keypad matrix interface.

Some embodiments of keypad security method 800 include other features. One embodiment of keypad security method 800 includes a debounce step in which a resulting keypad signal is debounced before determining which keypad matrix switch is activated. One exemplary implementation of the present invention utilizes a static signal to indicate whether static or varying driver signals are applied to the attributes of a keypad switch matrix.

Thus, the present invention is a system and method that increases the difficulty of interpreting electromagnetic emissions from a keypad system. The system and method reduces the probability of electromagnetic emission associated with sensitive key sequences since the driver signal values varying over both the keypad switch matrix pads and time. In one embodiment of the present invention the energy from the signals on the keypad is less and therefore EMI detection more difficult. The present invention provides these added security features with minimal design and device impact by providing keypad scanner information in a format compatible with standard devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A keypad security circuit comprising:
a column output driver adapted to drive a keypad strong driver signal on a column;
a row output driver adapted to drive a keypad strong driver signal on a row;
a programmable column word constructor coupled to said row output driver, said programmable column word constructor adapted to provide a weak driver signal on said column; and
a programmable row word constructor coupled to said column output driver, said programmable row word constructor adapted to provide a weak driver signal on said row;
a switch adapted to selectively connect said column and said row thereby forming a resulting signal; and
a comparator coupled to said column output driver and said row output driver, said comparator adapted to perform a bit wise comparison of said resulting signal and at least one of said strong driver signal on said column, said strong driver signal on said row, said weak driver signal on said column and said weak driver signal on said row.

2. The keypad security circuit of claim 1 wherein a set of random digital values is from a register file and are sequentially sent to the columns and rows as said strong driver signal on a column and said strong driver signal on a row.

3. The keypad security circuit of claim 1 wherein a set of digital values randomly varies over both the bits used to feed at least one of the driver signals over time.

4. The keypad security circuit of claim 3 wherein a register file is updated at random times or by events such as key presses.

5. The keypad security circuit of claim 3 wherein said weak driver signals are changed to be independently pulled up or pulled down to support random bit values on each of said rows and columns.

6. The keypad security circuit of claim 3 wherein said strong driver signal on a column is a logical zero value when an opposing row weak driver signal is a logical one value.

7. The keypad security circuit of claim 3 wherein said strong driver signal on a row is a logical one value when an opposing column weak driver signal is a logical zero value.

8. The keypad security circuit of claim 3 wherein said programmable column word constructor and said programmable row word constructor comprise both a pull-up and a pull-down that are independently enabled.

9. The keypad security circuit of claim 3 wherein said strong driver signal on a column and said strong driver signal on a row both connect to the same bits from a register file.

* * * * *